United States Patent [19]

Scales et al.

[11] 3,708,805

[45] Jan. 9, 1973

[54] PROSTHETIC ELBOW JOINT

[75] Inventors: John Tracey Scales, Stanmore; David Goddar, King's Langley, both of England

[73] Assignee: National Research Development Corp., London, England

[22] Filed: Dec. 21, 1970

[21] Appl. No.: 100,118

[30] Foreign Application Priority Data

Dec. 24, 1969 Great Britain.....................62,905/69

[52] U.S. Cl..........................................3/1, 128/92 C
[51] Int. Cl................................................A61f 1/24
[58] Field of Search....................3/1; 128/92 R, 92 C

[56] References Cited

UNITED STATES PATENTS 2,696,817  12/1954  Prevo..................................128/92 C

FOREIGN PATENTS OR APPLICATIONS 163,476  6/1958  Sweden..............................128/92 C

OTHER PUBLICATIONS

Vitallium Surgical Appliances Catalog, Austenal Medical Division, Howmet Corp., New York, N. Y., 1964, page 84, Mechanical Elbow Prosthesis No. 6943.

Primary Examiner—Richard A. Gaudet
Assistant Examiner—Ronald L. Frinks
Attorney—Cushman, Darby and Cushman

[57] ABSTRACT

A prosthetic elbow joint device comprises a humeral member, an ulnar member and a connecting piece to connect the humeral and ulnar members in a working relationship allowing hinging movement of the one relative to the other, the connecting piece and one of said members being formed to permit attachment of the connecting piece and said member in a working relationship allowing hinging movement between them, and the connecting piece and the other of said members being formed to permit attachment of the connecting piece and said other member in a substantially rigid fashion, thereby allowing assembly of the hinge joint of the device prior to insertion of the device into the patient, and location of the device on insertion so that the axis of the hinge joint lies through the epicondyles in a position conforming substantially with that in the natural elbow joint.

13 Claims, 12 Drawing Figures

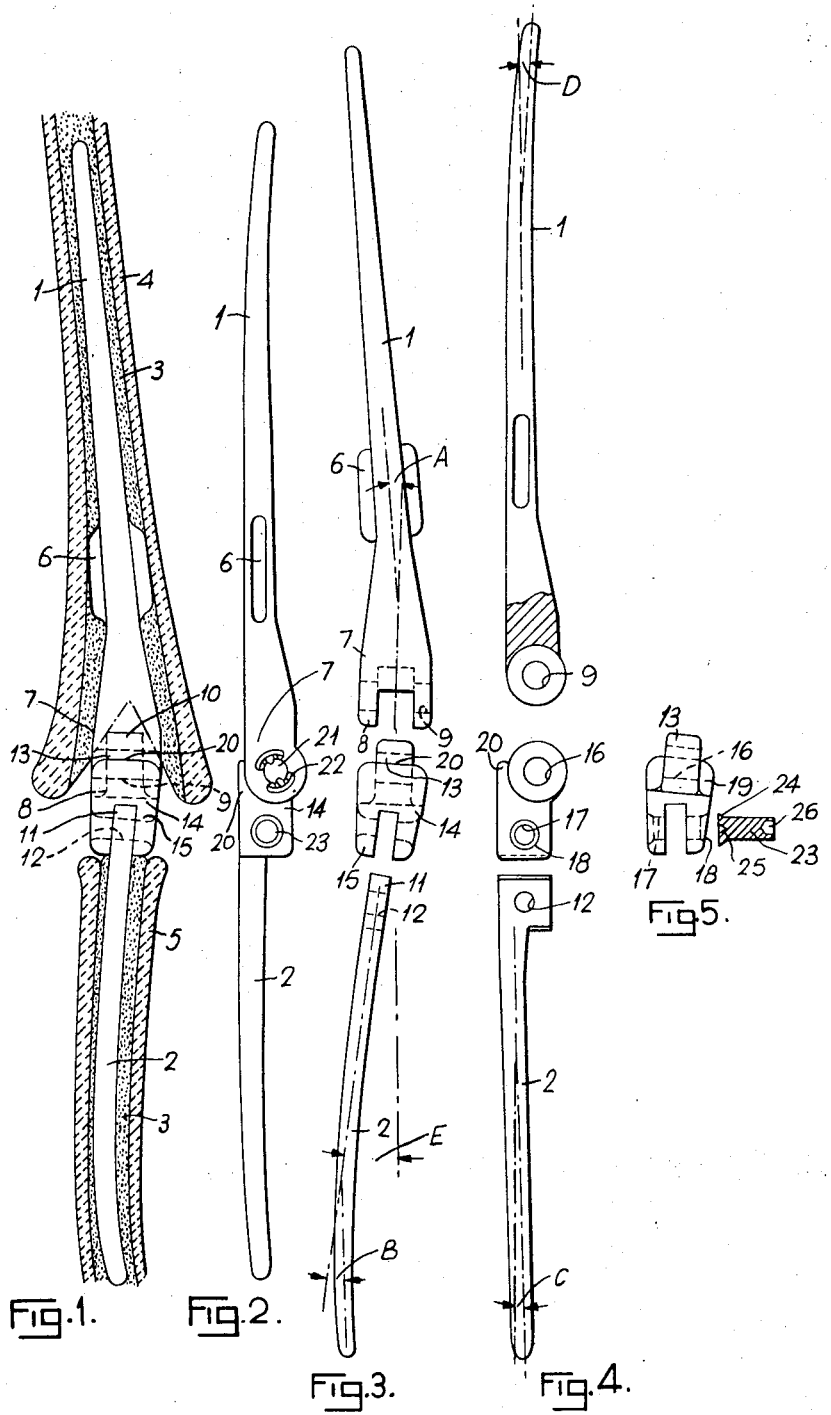

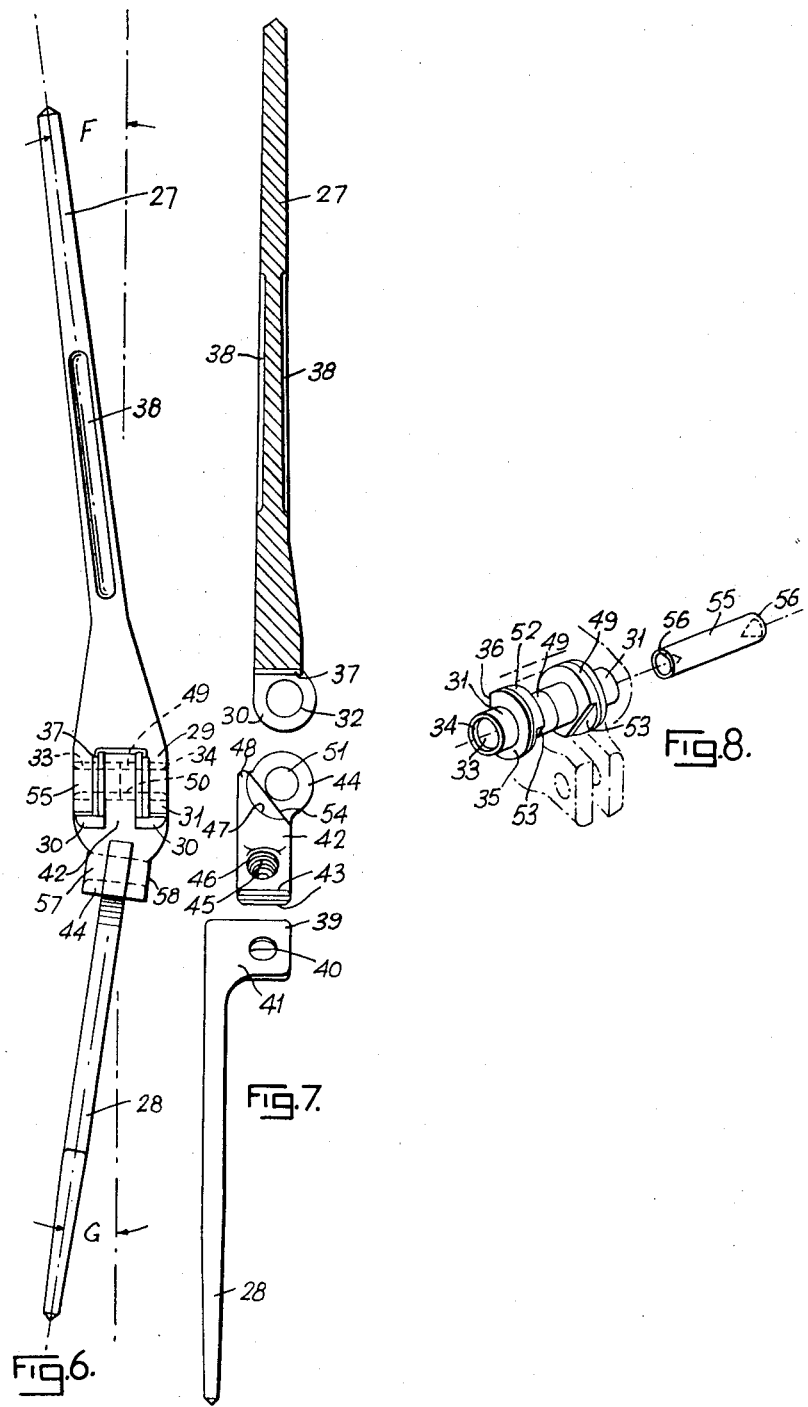

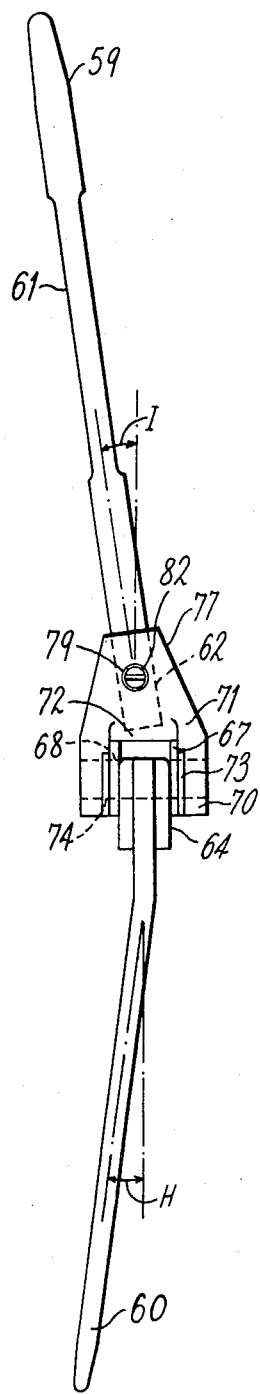
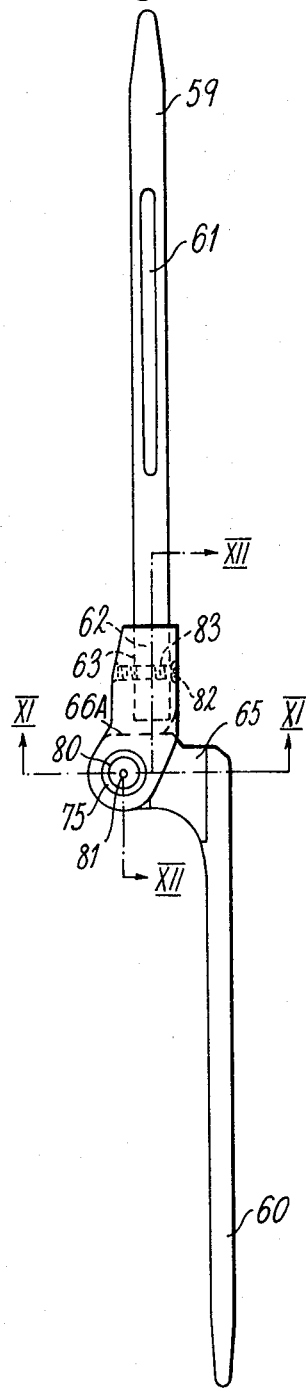
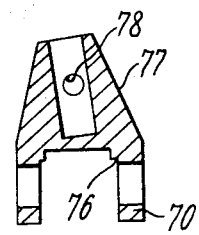
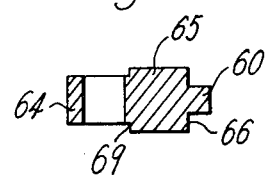

PROSTHETIC ELBOW JOINT

This invention relates to joints and in particular to prosthetic devices for the replacement of the human elbow joint.

Although the replacement of elbow joints affected by disease or injury has been accomplished, the prosthetic devices at present available for this purpose generally require the removal of at least one of the epicondyles in order to accommodate the hinge portion of the prosthesis and locate it with the axis of rotation in a position as near as possible to that in the natural joint. However, when damage is largely confined to the bearing surfaces of the joint, as for example is usual with patients suffering from arthritis, the removal of the epicondyles is not necessary on medical grounds and it is even undesirable, since their removal leaves the associated muscle origins unattached. It is an object of the present invention therefore, to provide a joint which permits the epicondyles and their associated muscle origins to be retained.

The object of this invention is achieved by means of a prosthetic device which comprises a humeral member, an ulnar member and a connecting piece. Accordingly the present invention comprises a connecting piece for use in a prosthetic elbow joint device to connect the humeral and ulnar members in a working relationship allowing hinging movement of the one relative to the other, the connecting piece being adapted to be connected to one of said members in a working relationship allowing hinging movement between the connecting piece and said member, and being adapted to be connected to the other of said members in a substantially rigid fashion, thereby allowing assembly of the hinge joint of the device prior to insertion of the device into the patient, and location of the device on insertion so that the axis of the hinge joint lies through the epicondyles in a position conforming substantially with that in the natural elbow joint.

The invention also includes a prosthetic elbow joint device comprising a humeral member, an ulnar member and a connecting piece to connect the humeral and ulnar members in a working relationship allowing hinging movement of the one relative to the other, the connecting piece being adapted to be connected to one of said members in a working relationship allowing hinging movement between the connecting piece and said member, and being adapted to be connected to the other of said members in a substantially rigid fashion, thereby allowing assembly of the hinge joint of the device prior to insertion of the device into the patient, and location of the device on insertion so that the axis of the hinge joint lies through the epicondyles in a position conforming substantially with that in the natural elbow joint.

In order to accommodate the connecting piece so that the axis of the hinging movement between it and the said member lies in the desired position, a wedge-shaped piece of the humerus including portions of the trochlea and the capitulum is removed from between the epicondyles. That portion of the ulna containing the trochlear notch is also removed, and, if necessary, that portion containing the radial notch. As much of the olecranon as possible is retained, however. The location of the hinge portion of the device between the epicondyles has the added advantage that protection is thereby provided against contact of this portion with the skin, which can lead to damage to the skin if the elbow receives accidental knocks or experiences heavy pressure.

The terms anterior, posterior, lateral, medial, distal, proximal and superior as used in the specification in describing the prosthetic device or a part thereof refer to the position of the device when located in the anatomical position in the patient.

Conveniently, when the hinging movement occurs between the humeral member and the connecting piece, the distal end of the humeral member may be formed as a female hinge portion and the proximal end of the connecting piece may be formed as a male portion which co-operates with this female portion, and when the hinging movement occurs between the ulnar member and the connecting piece, the distal end of the connecting piece may be formed as a female hinge portion and the proximal end of the ulnar member may be formed as a male portion which co-operates with this female portion. In either case the female hinge portion preferably takes the form of a two-pronged fork, the male portion conveniently being retained between the prongs of the fork by the insertion of a journal, about the longitudinal axis of which hinging movement can take place, into bores formed through the prongs of the fork and through the male portion, the journal being positively secured in position before the device is inserted into the patient, for example by turning over lugs on the outer faces of the prongs or by forming over the end of the journal.

The substantially rigid connection between the connecting piece and the humeral or ulnar member may conveniently be provided by a joint of the mortise and tenon type, a mortise portion being formed from one of the members and a tenon portion, which co-operates with the mortise portion, being formed from the other member. Preferably, in both cases, it is the connecting piece which provides the mortise portion whilst the humeral or unlar member provides the tenon portion. In one preferred embodiment, therefore, the connecting piece is provided with a mortise portion at the distal end for joining it to a tenon portion at the proximal end of the ulnar member and a male portion at the proximal end for joining it to a female hinge portion at the distal end of the humeral member. The mortise portion may take the form of a two-pronged fork, the tenon portion conveniently being retained between the prongs of the fork by the insertion of a pin into bores formed through the prongs of the fork and through the tenon portion, the pin being secured in position after the device has been assembled in the patient. One convenient method of securing the pin in position is for the prongs of the fork to be formed with a countersunk area about the bores into which the ends of the pin can be formed. Hinging movement of the tenon portion between the prongs of the fork about the longitudinal axis of the pin may be substantially prevented by forming the tenon portion as a close fit between the prongs. The use of a close fit does, however, sometimes lead to difficulties in locating the tenon portion between the prongs of the fork when the two portions have blood and other material on them. These difficulties may be substantially overcome by the use of a mortisetenon combination in the form of a dowel joint. Thus the mortise portion may contain a hole of substantially cylindrical shape which co-operates with a suitably shaped tenon portion. The two portions may be held together, when assembled, by the insertion of a screw into bores formed through the two portions. The use of a dowel type of joint is particularly suitable when the substantially rigid joint is between the humeral member and the connecting piece. In another preferred embodiment, therefore, the connecting piece is provided with a female hinge portion at the distal end for joining it to a male portion at the proximal end of the ulnar member and a mortise portion at the proximal end for joining it to a tenon portion at the distal end of the humeral member to provide a dowel joint. A prosthetic device in which the connecting piece takes this form has the advantage of being more compact than one in which the connecting piece has the form wherein the proximal end provides a male portion and the distal end a mortise portion, particularly when such preferred features are incorporated in the device as that discussed hereinafter of cranking the stem of the ulnar member.

When a prosthetic device is provided with a hinge joint it is possible for the surrounding tissues to be trapped in the joint. In order to reduce the possibility of this happening the male portion of the hinge joint may be designed so that when assembled with the female portion it overlaps and conforms to the surface of the female portion posteriorly, and preferably postero-inferiorly, for example extending through about 120°. Conveniently, with the device fully extended, the male and female portions are in actual contact inferiorly but not posteriorly.

The proximal and distal portions of the humeral and ulnar members, respectively, may be adapted in various ways to allow attachment of the members to the humerus and ulna respectively. Preferably both members are formed with a projecting stem which can be inserted into the marrow cavity of the bone after excavation of a suitable space, and then cemented into position, for example with an acrylic resin. If desired, the stems may be of non-circular cross-section to provide for firmer fixation. The stems of the two members, and particularly that of the humeral member, may for the same reason be provided with irregularities in their surfaces. These irregularities may take the form either of indentations, for example cuts or grooves, or of protuberances, for example flanges or raised hemispherical projections. In order to make for easier withdrawal of the humeral and ulnar members should the prosthesis have to be removed at any time, the stems of these members may be tapered towards their proximal and distal ends respectively. The stem of the ulnar member is preferably curved to substantially conform to the shape of the bone. Thus, the stem may be curved through an angle of between 7° and 9°, for example about 8°, in the latero-medial direction and, if desired, may also be curved through an angle of between ½° and 2°, for example about 1½°, in the postero-anterior direction. Conveniently, the stem of the humeral member may also be curved to substantially conform to the shape of the bone, the curving being in the postero-anterior direction only and amounting to between 2° and 4°, for example about 3°. The stems may be manufactured with the required curvature or, alternatively, the stems may initially be straight, and the curving required for an individual patient may be provided by bending the stems before insertion, during the operation.

In the natural fully extended elbow joint the lateromedial plane containing the upper part of the arm, when the arm is held with the palm of the hand forwards in the anatomical position, does not also include the lower part of the arm, which instead lies in a plane parallel to the first but displaced posteriorly from it. In order to avoid undue distortion of the bones from their natural position it is preferable that the humeral and ulnar members of the device have a substantially similar relationship in this respect to that prevailing in the natural joint, and accordingly, the proximal end of the ulnar member may conveniently be provided with a crank which displaces the stem with respect to that of the humeral member posteriorly through a distance of from about ⅜ to about ⅝ inch, for example ½ inch.

Furthermore, in the natural fully extended elbow joint, with the arm held with the palm of the hand forwards in the anatomical position, the lower and upper parts of the arm do not lie in the postero-anterior plane through the center of the axis of the joint but instead deviate out of this plane in the lateral direction, the total angle of deviation being known as the cubital angle. The cubital angle, which is about 10° – 15° in the male and 20° – 25° in the female, is usually made up from equal deviations at the elbow of the upper and lower parts of the arm. Thus the axis of the hinge of the natural elbow joint will make an equal angle in the plane of the extended arm with the two parts of the arm. It is again preferable that the device should allow a similar arrangement of the bones of the upper and lower parts of the arm to that found in nature since the existence of the cubital angle enables the carrying of a load away from the body without the necessity for holding the upper arm away from the body, and the bisection of the angle in the way described is important in relation to the coordination of movements in which the hand is brought up towards the shoulder. A prosthetic device according to the present invention is therefore preferably designed so that, apart from any curvature the stems may have, the stems of the humeral and ulnar members deviate through an angle in the lateral deviation from the postero-anterior plane through the center of the axis of the hinge of the prosthesis. This angling of the stems of the humeral and ulnar members may be provided by incorporating an angle within the members themselves or alternatively the angling of the stem of one of the members may be provided by incorporating an angle within the connecting piece. Thus, for example, the angling of the stem of the humeral member may be provided by disposing the stem of the member at an angle to its distal end, whilst the angling of the stem of the ulnar member may be provided by disposing the proximal end of the connecting piece at an angle to its distal end, the stem of the ulnar member being curved if desired but not angled. Conveniently, a value from the middle of the range found for the cubital angle in nature may be selected and incorporated in the device, the same device then being used for males and females. The value selected for the total angle of deviation of the stems of the two members is preferably in the range 12° – 22°, for example 16°, and conveniently the stems of both members are angled by about half of the selected value, for example 8°.

A wide variety of materials may be used in the manufacture of the device either in whole or in part, including metals, metal alloys, plastics materials and various types of material reinforced with carbon fibers. When some materials are used, for example titanium, bearing bushes of different material may be used for those parts of the device where movement occurs.

Angulation and curving of members of the prosthetic device necessitate that in specific embodiments of the invention incorporating these features different forms of the device are used for the replacement of the natural elbow joints of the right and left arms.

Several embodiments of the invention are illustrated by way of example only in the accompanying drawings which are diagrammatic in nature and not to scale.

FIGS. 1 to 5 show a prosthetic device entirely of cobalt-chromium-molybdenum alloy for insertion into the left arm of a patient and FIGS. 6 to 8 and 9 to 12 show prosthetic devices for insertion into the right arm and left arm, respectively, of a patient in which the main structure of the humeral and ulnar members and the connecting piece is of titanium but with some other parts of cobalt-chromium alloy or RCH 1000 polyethylene rather than titanium, as indicated. in FIG. 1 only, the device is shown in position in the arm, the humerus and ulna into which the device is inserted and the resin surrounding the device being shown in section, the V-shaped portion of the humerus which is removed being clearly indicated.

FIG. 1 shows the posterior aspect of the fully assembled device;

FIG. 2 shows the medial aspect of the fully assembled device;

FIG. 3 shows the posterior aspect of the humeral and ulnar members, and the connecting piece of the device before assembly;

FIG. 4 shows the medial aspect of the humeral and ulnar members, and the connecting piece of the device before assembly, but aligned as when assembled, the humeral member being shown in part section;

FIG. 5 shows the anterior aspect of the connecting piece and the pin which secures it to the ulnar member, the pin being shown in section;

FIG. 6 shows the anterior aspect of the fully assembled device;

FIG. 7 shows the lateral aspect of the humeral and ulnar members, and the connecting piece of the device before assembly, but aligned as when assembled, and before insertion of the bearing bushes, the humeral member being shown in section;

FIG. 8 shows a perspective view of the bearing bushes and the hinge journal which connects the humeral member and the connecting piece;

FIG. 9 shows the posterior aspect of the fully assembled device;

FIG. 10 shows the lateral aspect of the fully assembled device;

FIG. 11 shows a section as on the line XI — XI (FIG. 10) through the ulnar member only, before insertion of the bearing bush; and FIG. 12 shows a section as on the line XII — XII (FIG. 10) through the connecting piece only, before insertion of the bearing bushes.

In FIGS. 1 to 4, the humeral and ulnar members have tapered stem portions 1 and 2, respectively, which are of elliptical-cross-section to assist in the anchoring of the stem portions 1 and 2 in the acrylic resin 3 filling the marrow cavities of the humerus 4 and ulna 5, respectively. The humeral member also has two wings 6 extending in the latero-medial plane for this purpose. The distal end of the humeral member is formed with a female hinge portion 7 comprising a fork made up of two prongs 8, each having a bore 9, joined by a cross-member 10. As can be clearly seen in FIG. 3, the depth of the prongs 8 is greater on the anterior face of the portion 7 than on the posterior face. (The shape of the anterior face of the portion 7 is shown by dotted lines in FIGS. 1 and 3.) The stem portion 1 of the humeral member projects from the female hinge portion 7 at an angle A (FIG. 3) of 8° and is curved through an angle D (FIG. 4) of 3° in the postero-anterior direction. The proximal end of the ulnar member is formed with a tenon portion 11 having a bore 12. The stem portion 2 of the ulnar member adjoins the tenon portion 11 co-linearly but is curved through an angle B (FIG. 3) of 8° in the latero-medial direction and through an angle C (FIG. 4) in the postero-anterior direction.

In FIGS. 1 to 5, the connecting piece is provided at one end with a male portion 13 and at the other end with a mortise portion 14 formed as a fork having two prongs 15, the portion 14 deviating from co-linearity with the portion 13 by an angle E (FIG. 3) of 8°. The male portion 13 is provided with a bore 16 and the mortise portion 14 is provided with bores 17 through the prongs 15, a countersunk area 18 being provided around the bore 17 on the outer face of each prong 15 (FIG. 4). The male portion 13 is provided on its lateral and medial faces with curved shoulders 19 which join across the posterior face of the member to form a ridge 20.

The connecting piece is joined to the humeral member by insertion of a hinge journal 21 through the bores 9 in the prongs 8 of the humeral member and through the bore 16 in the male portion 13 of the connecting piece. The hinge journal 21 is retained in position, once inserted, by tapping over the two lugs 22 on each of the outer faces (shown for the medial prong) of the prongs 8 of the humeral member. Hinging movement can thus occur about the longitudinal axis of the hinge journal 21. The connecting piece is joined to the ulnar member by insertion of a pin 23 through the bores 17 in the prongs 15 of the connecting piece and through the bore 12 in the tenon portion of the ulnar member. One end 24 of the pin 23, as shown in FIG. 5, has the form of a countersunk head provided with a center hole 25, while the other end 26 has the form of a rivet. The pin 23 is retained securely in place once inserted by forming the rivet end 26 of the pin 23 into the countersunk portion 18 of one of the prongs 15 using a suitably designed G-clamp located across the ends of the pin 23 with the aid of the center hole 25. The pin 23 may thus be inserted from either the lateral or medial side of the prosthesis. The fit of the tenon portion 11 between the prongs 15 is of an accuracy such as to provide a substantially rigid fit between the connecting piece and the ulnar member. The design of the curved shoulder portions 19 is such that although contact of these portions with the prongs 8 of the humeral member provides a limit to the degree of extension of the device possible and thus prevents hyperextension, this contact is restricted to an area near the tips of the prongs 8, and no contact of the curved shoulders 19 with the prongs occurs in the area nearer the cross-member 10, nor does the ridge 20 contact the cross-member 10. In replacing the elbow joint of a patient by the device, the appropriate portions of the humerus and ulna, including as much of the marrow and trabeculae as required, are removed. The stem 1 of the humeral member, which is already joined to the connecting piece, is then inserted into the cavity in the humerus 4 to a depth such that the axis of the hinge of the device is located in substantially the same position as for the natural joint, and cemented in position. The stem portion 2 of the ulnar member is next cemented into the cavity in the ulnar 5. The tenon portion 11 of the ulnar member is positioned between the prongs 15 of the connecting piece and the pin 23 is inserted through the bore 17 in one of the prongs 15, through the bore 12 in the tenon portion 11 and into the bore 17 in the other prong 15. The G-clamp device is then used to splay the end 26 of the pin 23 thus securing it in position. The assembly of the ulnar member and connecting piece may be carried out whilst the acrylic resin 3 is still plastic or after it has set.

In an alternative embodiment the ulnar member of the device of FIGS. 1 to 5 can be cranked in a similar fashion to that of the prosthesis of FIGS. 6 to 8.

In FIGS. 6, 7 and 8 the humeral and ulnar members have tapered stem portions 27 and 28 of generally elliptical cross-section which are both straight and show no curvature in either the latero-medial or postero-anterior planes. Before insertion into the patient, however, the stem portions 27 and 28 may be bent to suit the individual patient, the curvature being generally similar to that of the device of FIGS. 1 to 5. The humeral member is provided at the distal end with a female hinge portion 29 formed as a fork having two prongs 30. As with the device of FIGS. 1 to 5 the depth of the prongs 30 is greater on the anterior face of the humeral member than on the posterior face. Each prong 30 is provided with a bearing bush 31 of cobalt-chromium alloy which is originally inserted from the inside of the prong into a suitably sized bore 32 formed through the prong. The bushes 31 have bores 33 formed therein, the bores being widened at the outer end to form a countersunk area 34 in the bush 31 on the outer face of the prong 30. Each of the bushes 31 has a flange 35 with a flat 36 formed thereon which abuts on a ridge 37 formed on the inner face of the prong 30 to prevent any rotation of the bush 31. The stem portion 27 of the humeral member projects from the portion 29, deviating from co-linearity by an angle F (FIG. 6) of 8°, and has two grooves 38 formed in the anterior and posterior faces thereof. The proximal end of the ulnar member is formed with a tenon portion 39 having a bore 40, the stem portion 28 being offset from the portion 39 by a cranked portion 41 but not being angled as is the stem portion 27 of the humeral member.

The connecting piece is provided at its distal end with a mortise portion 42 formed as a fork having two prongs 43 and at its proximal end with a male portion 44, the portion 44 deviating from co-linearity with the portion 42 by an angle G (FIG. 6) of 8°. The mortise portion 42 is provided with bores 45 through the prongs 43, a countersunk area 46 being provided around the bore 45 on the outer face of each prong 43.

The male portion 44 is provided on its lateral and medial faces with curved shoulders 47 which join across the posterior face of the member to form a ridge 48, the shoulders 47 and the ridge 48 fulfilling the same function as the corresponding members 19 and 20 in the device of FIGS. 1 to 5. The portion 44 is further provided with a bearing bush 49 of RCH 1000 polyethylene which is formed in two halves having a bore 50 running through them, one half being inserted into each end of a suitably sized bore 51 formed in the portion 44. Each half of the bush 49 has a flange 52 with a ridge 53 formed thereon which abuts on a ledge 54 formed on the portion 44 to prevent rotation of the bush 49.

The connecting piece is joined to the humeral member by insertion of a hinge journal 55 of cobalt-chromium alloy having ends 56 in the form of a rivet through the bores 33 in the bushes 31 of the humeral member and through the bore 50 in the bush 49 of the connecting piece. The hinge journal 55 is retained in place once inserted by forming the rivet ends 56 of the hinge journal 55 into the countersunk areas 34 on the outer faces of the prongs 30. Hinging movement can then occur about the longitudinal axis of the hinge journal 55. The connecting piece is joined to the ulnar member by insertion of a pin 57 of cobalt-chromium alloy, identical to the hinge journal 55 and having ends 58 in the form of a rivet, through the bores 45 in the prongs 43 of the connecting piece and through the bore 40 of the ulnar member, the pin 57 being retained in place holding the connecting piece and ulnar members rigidly together by forming the rivet ends 58 of the pin 57 into the counter-sunk areas 46 on the outer faces of the prongs 43. Both the hinge journal 55 and the pin 57 may be inserted from either the medial or the lateral side of the device. Insertion of the device into a patient is carried out in an essentially similar fashion to that employed with the device of FIGS. 1 to 5, the stem portions 27 and 28 first being bent as required, and the final location in the humerus and ulna is similar to that shown in FIG. 1 for the other device.

In FIGS. 9, 10, 11 and 12, the humeral and ulnar members have stem portions 59 and 60, respectively. The stem portion 59 is of substantially circular cross-section whilst the stem portion 60 is of substantially quadrodial cross-section. Both stem portions 59 and 60 show no curvature in the latero-medial or postero-anterior planes but may be bent as required before insertion into a patient. The stem portion 59 of the humeral member has two grooves 61 formed in the lateral and medial faces thereof. The distal end of the humeral member is formed as a tenon portion 62 of circular cross-section containing a bore 63 therein. The ulnar member is provided at its proximal end with a male portion 64 to which the stem portion 60 is connected through a cranked portion 65, two ridges 66 being formed at the juncture of the stem portion 60 and the cranked portion 65. The stem portion 60 is angled through an angle H of 8° in the lateral direction at a point close to its juncture with the cranked portion 65. The posterior side of the superior face 66A of the male portion 64 abuts on the connecting member to prevent hyperextension of the prosthesis, the shaping of the face 66 and of the connecting member being such as to assist in avoiding the trapping of tissue by easing it from between the face 66 and the connecting member as the arm is fully extended. The male portion 64 is provided with a RCH 1000 polyethylene bearing bush 67 containing a bore 68, this bush 67 being identical with that of the connecting member of the device of FIGS. 6 to 8 and abutting on ledges 69 formed on the male portion 64 to prevent rotation of the bush 67.

The connecting piece is provided at its distal end with a female hinge portion formed as a fork having two prongs 70 joined by a cross-member 71 having a hollowed portion 72 on its posterior face to complement the shaping of the face 66 of the male portion 64 of the ulnar member. Each of the prongs 70 is provided with a cobalt-chromium alloy bearing bush 73 containing a bore 74 widened at the outer end to form a countersunk area 75 in the bush 73 on the outer face of the prong 70, these bushes being identical with those of the humeral member of the device of FIGS. 6 to 8 and abutting on a ridge 76 formed on the inner faces of the prongs 70. At its proximal end the connecting piece is provided with a mortise portion 77 having a bore 78 formed therein widened at the outer ends to form countersunk areas 79 on the posterior and anterior faces of the mortise portion 77. In the construction of the connecting member the relative arrangement of the prongs 72 thereof and the mortise portion 77 thereof is such that the mortise portion 77, and thus the stem portion 59 of the humeral member when assembled with its tenon portion 62 in the mortise portion 77, is angled at an angle I of 8° in the lateral direction with respect to the prongs 70.

The connecting piece is joined to the ulnar member by insertion of a hinge journal 80 of cobalt-chromium alloy through the bores 74 in the bushes 73 of the connecting piece and through the bore 68 in the bush 67 of the ulnar member, the hinge journal 80 being identical in form with the pin 23 of the device of FIGS. 1 to 5. The hinge journal 80, which can be inserted from either side is retained securely in place once inserted by forming its rivet end 81 into the countersunk area 75 in a similar fashion to that described for the pin 23 of the device of FIGS. 1 to 5. The connecting piece is joined to the humeral member by insertion of a titanium screw 82, containing a nylon insert 83 in the shank portion thereof, through the bore 78 in the connecting piece aN through the bore 63 of the humeral member. The screw 82 is of such a length that its end does not emerge on the far side of the connecting piece, and its head is contained in one of the counter-sunk areas 79, the screw 82 being capable of insertion from either side.

In replacing the elbow joint of a patient by the device, the appropriate portions of the humerus and ulna, including as much of the marrow and trabeculae as required, are removed. The portions requiring removal are substantially similar to those removed with the devices of FIGS. 1 to 5 and 6 to 8 although the closer proximity of the cranked portion 65 of the ulnar member to the hinge joint means that somewhat less of the proximal end of the ulna needs to be removed than with the device of FIGS. 6 to 8 and, in addition, that part of the stem portion 60 between the ridges 66 lies in a channel formed in the bone. The device is initially fully assembled with the hinge journal 80 in position as finally required but with a temporary screw (not shown) used in place of the screw 82. The stem portion 59 of the humeral member is first cemented in position in the humerus with acrylic resin and once the resin has cured the temporary screw is undone and the ulnar member and connecting piece separated from the humeral member. The ulnar member is then cemented into the ulna with acrylic resin, the tenon portion 62 of the humeral member is inserted once more into the mortise portion 77 of the connecting piece and the connection is now made with the screw 82. If desired, a readily extractable plastic plug may be inserted into the cylindrical aperture in the mortise portion 77 of the connecting piece while the ulnar member is fitted into the ulna in order to prevent any material entering the aperture. Before the resin in the ulna has cured the relative position of the ulna and humerus is checked by flexing the arm and, if necessary, adjusted by rotation of the ulna relative to the stem portion 60 of the ulnar member, the stem portion 60 being retained in this position until the resin cures. The final location in the humerus and ulna is similar to that shown in FIG. 1 for the other device.

We claim:

1. A prosthetic elbow joint device comprising:

three discrete elements, being a humeral member, an ulnar member and a connecting piece;

said humeral member having a proximal portion for attachment to the humerus and a distal end for connection with said connecting piece;

said ulnar member having a distal portion for attachment to the ulnar and a proximal end for connection with said connecting piece;

said connecting piece having a proximal end for attachment to the humeral member and a distal end for attachment to the ulnar member;

means connecting one of said proximal and distal ends of said connecting piece with one of said distal end of said humeral member and said proximal end of said ulnar member, respectively, in a working relationship to define a hinge joint allowing hinging movement between them and means connecting the other of said ends of said connecting piece with the other of said ends of said humeral and ulnar members in a substantially rigid fashion;

whereby the hinge joint of the device between said connecting piece and one of said humeral and ulnar members can be assembled prior to the insertion of the device into the patient allowing location of the device on insertion with the axis of said hinge joint lying through the epicondyles in a position conforming substantially with that in the natural elbow joint, and further assembly of the device can be completed following insertion of the device into the patient by connection in a substantially rigid fashion of said connecting piece and the other of said humeral and ulnar members.

2. A device according to claim 1, wherein the distal end of one of the humeral member and the connecting piece is formed as a female hinge portion and the proximal end of one of the connecting piece and the ulnar member, respectively, is formed as a male portion which co-operates with said female portion.

3. A device according to claim 2, wherein the female hinge portion has the form of a two-pronged fork, the prongs of the fork and the male portion being provided with bores; a hinge journal, the male portion being retained between the prongs of the fork by the insertion of said hinge journal through the bores.

4. A device according to claim 3, wherein the humeral member and connecting piece are provided with bearing bushes in which the bores are formed whereby the hinge journal bears against these bushes.

5. A device according to claim 1, wherein the connecting piece and said other member are formed to provide a joint of the mortise and tenon type.

6. A device according to claim 5, wherein the connecting piece and said other member are formed to provide a joint of the dowel type held together by a locking screw.

7. A device according to claim 1, wherein the proximal portion of the humeral member and the distal portion of the ulnar member are formed as projecting stems for insertion into the marrow cavity of the humerus and ulna, respectively, and securement therein.

8. A device according to claim 7, wherein the stems of at least one of the humeral and ulnar members are curved to conform to the shape of the marrow cavity of the bone.

9. A device according to claim 7, wherein the stem of the ulnar member is displaced posteriorly with respect to the stem of the humeral member.

10. A device according to claim 7, wherein the stems of the humeral and ulnar members are relatively inclined in the assembled prosthesis through an angle in the lateral direction from the postero-anterior plane through the center of the axis of the hinge joint.

11. A device according to claim 1, wherein the proximal end of the connecting piece is formed as a male portion that co-operates with the distal end of the humeral member which is formed as a female hinge portion, and the distal end of the connecting piece is formed as a mortise portion that co-operates with the proximal end of the ulnar member which is formed as a tenon portion.

12. A device according to claim 1, wherein the proximal end of the connecting piece is formed as a mortise portion that co-operates to form a dowel joint with the distal end of the humeral member which is formed as a tenon portion, and the distal end of the connecting piece is formed as a female hinge portion that co-operates with the proximal end of the ulnar member which is formed as a male portion.

13. A prosthetic elbow joint device comprising:
three discrete members, consisting of a humeral member, an ulnar member, and a connecting piece;
said humeral and ulnar members each having a stem, one of said members having a first hinge part and the other having a first attachment part;
said connecting piece having a second hinge part and a second attachment part;
said first and second hinge parts being pivotally connected and said first and second attachment parts being substantially rigidly connected;
whereby the hinge joint of the device between said connecting piece and one of said humeral and ulnar members can be assembled prior to the insertion of the device into the patient allowing location of the device on insertion with the axis of said hinge joint lying through the epicondyles in a position conforming substantially with that in the natural elbow joint, and further assembly of the device can be completed following insertion of the device into the patient by connection in a substantially rigid fashion of said connecting piece and the other of said humeral and ulnar members.

* * * * *

UNITED STATES PATENT OFFICE
CERTIFICATE OF CORRECTION

Patent No. 3,708,805      Dated January 9, 1973

Inventor(s) John Tracey Scales and David Goddard

It is certified that error appears in the above-identified patent and that said Letters Patent are hereby corrected as shown below:

In the heading, line [75] the second inventor's name, which reads Goddar, should read Goddard.

Signed and sealed this 29th day of May 1973.

(SEAL)
Attest:

EDWARD M. FLETCHER, JR.       ROBERT GOTTSCHALK
Attesting Officer      Commissioner of Patents